United States Patent
Eckel et al.

(10) Patent No.: US 7,827,455 B1
(45) Date of Patent: Nov. 2, 2010

(54) SYSTEM AND METHOD FOR DETECTING GLITCHES ON A HIGH-SPEED INTERFACE

(75) Inventors: Nathan A. Eckel, Fridley, MN (US); Peter Levinshteyn, Blaine, MN (US); Gary J. Lucas, Pine Springs, MN (US)

(73) Assignee: Unisys Corporation, Blue Bell, PA (US)

( * ) Notice: Subject to any disclaimer, the term of this patent is extended or adjusted under 35 U.S.C. 154(b) by 637 days.

(21) Appl. No.: 11/799,304

(22) Filed: May 1, 2007

(51) Int. Cl.
*G11C 29/00* (2006.01)
*G11B 5/00* (2006.01)
*G11B 20/20* (2006.01)
*G06K 5/04* (2006.01)
*G01R 31/26* (2006.01)

(52) U.S. Cl. .................. 714/735; 714/700; 714/712; 714/724; 365/201; 324/765

(58) Field of Classification Search .................. None
See application file for complete search history.

(56) References Cited

U.S. PATENT DOCUMENTS

| | | | | |
|---|---|---|---|---|
| 4,366,478 A | * | 12/1982 | Masuda et al. ............. | 340/825 |
| 5,185,748 A | * | 2/1993 | Fujimura ................... | 714/820 |
| 5,506,809 A | * | 4/1996 | Csoppenszky et al. ...... | 365/221 |
| 5,649,106 A | * | 7/1997 | Tsujimichi et al. .......... | 709/221 |
| 5,862,350 A | * | 1/1999 | Coulson ..................... | 710/302 |
| 6,377,065 B1 | * | 4/2002 | Le et al. .................... | 324/765 |
| 7,188,282 B2 | * | 3/2007 | Walmsley ................... | 714/718 |
| 7,461,316 B2 | * | 12/2008 | Hasegawa et al. ........... | 714/744 |
| 2002/0083376 A1 | * | 6/2002 | Self et al. .................... | 714/56 |
| 2004/0015734 A1 | * | 1/2004 | Rahman ..................... | 713/401 |
| 2004/0015774 A1 | * | 1/2004 | Sakai et al. ................. | 714/797 |

* cited by examiner

*Primary Examiner*—Jeffrey A Gaffin
*Assistant Examiner*—Guerrier Merant
(74) *Attorney, Agent, or Firm*—Robert P. Marley

(57) ABSTRACT

The current invention provides a mechanism for detecting and recovering from glitches on data strobes. In one embodiment, data is captured from an interlace by a receiver using at least one data strobe that is provided by the transmitter along with the data. A write address counter that is clocked by the data strobe is used to count the active edges of the data strobe. A read address counter that is periodically synchronized with the write address counter, but that is clocked by an internal clock of the receiver, is used to count units of data being received from the interface. Periodically, the contents of the read and write counters are compared. If the contents are not the same, a glitch has occurred on the data strobe. The glitch is recoverable if it occurs on, or after, a last strobe edge of a data transfer.

17 Claims, 10 Drawing Sheets

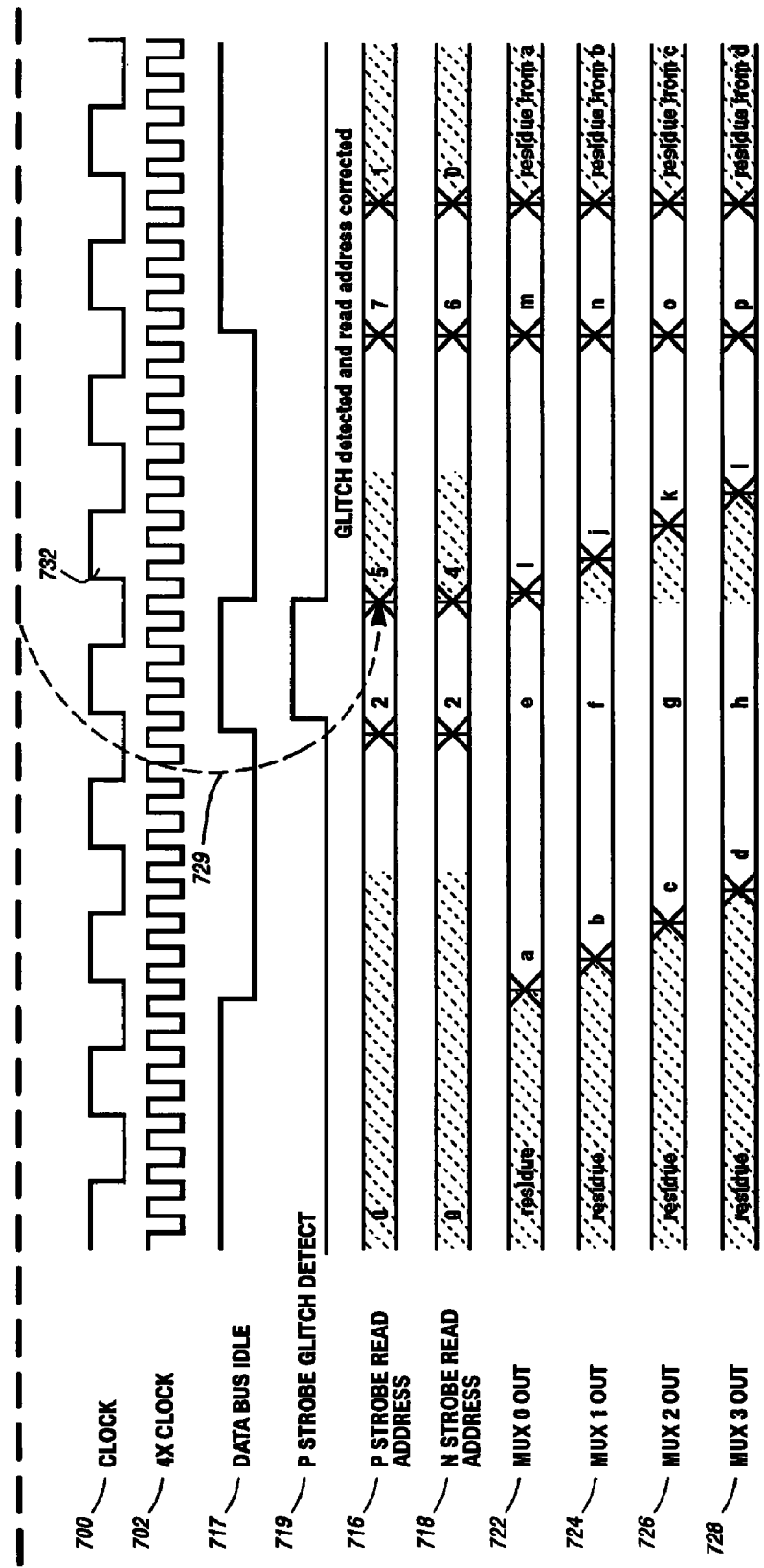

SYSTEM AND METHOD FOR DETECTING GLITCHES ON A HIGH-SPEED INTERFACE

FIELD OF THE INVENTION

The current invention relates to a mechanism for transferring signals over interfaces of a data processing system; and more particularly, relates to detecting glitches occurring on data strobes employed during high-speed data transfers.

BACKGROUND OF THE INVENTION

Modern data processing systems transfer data and other signals at very high speeds. When data is transferred over interfaces at high rates of speed, it is a common technique to use a strobe that is transferred with the data to capture that data at the receiver. Because the strobe is launched with the data, the delay that is imposed upon the strobe when traveling across the interface approximates that experienced by the data. This allows the strobe to remain synchronized with the data so that an edge of the strobe may be used by the receiver to capture the data.

The above-described mechanism is premised on the ability to provide a strobe that has well-defined edges and does not contain "glitches". As is known in the art, a glitch is an unintended signal pulse shorter than a specified minimum that may be caused by noise or other electrical phenomenon. For instance, a strobe being transferred across a bus may experience a glitch because of signal reflections on imperfectly terminated printed-circuit board (PCB) interfaces.

When a glitch occurs on a strobe, the results may be catastrophic, particularly when that strobe is being used to capture data. If the glitch causes data corruption to occur, recovery actions will likely be necessary. The ability to continue operation will depend on the extent of the corruption, and the error correction mechanisms in use within the system, which may include parity or other error-correction code schemes. In a worst-case scenario in which the data cannot be recovered and a backup copy does not exist, a system stop may be required. Thus, what is needed is a glitch detection mechanism that will allow for a complete recovery to avoid system stops, while at the same time reporting the existence of glitches so that remedial actions may be taken at some convenient time in the future.

SUMMARY OF THE INVENTION

The current invention provides a mechanism for detecting and recovering from glitches on data strobes. In one embodiment, data is captured off an interface by a receiver using at least one data strobe that is provided by the transmitter along with the data. As this data is being captured, each active edge of the data strobe is also used to increment a write counter. This write counter determines an address within an input storage device of the receiver into which each unit of received data will be stored. In one implementation, the input storage device is a FIFO.

While units of data are being captured from the interface and stored into the input storage device of the receiver using the data strobe, previously-captured units of data are transferred from the input storage device into an internal buffer of the receiver. These transfers occur in a manner that is synchronous to an internal clock of the receiver. To facilitate these transfers, a read counter that is also synchronous with the internal clock is used to generate read addresses for retrieving the data from the input storage device.

Because the write counter is incremented using the data strobe, any glitches appearing on that strobe may cause the write counter to be incremented "falsely". When this occurs, the write counter is no longer synchronized with the read counter. As a result, the write counter will be storing a unit of data into one address of the input storage device and sometime later, the read counter will be attempting to retrieve that same unit of data from a different address of the input storage device. This will result in data corruption.

To detect the foregoing scenario, the contents of the read counter and the write counter are periodically compared to one another. In one embodiment, this comparison occurs after each eight-word transfer of data has been captured off the interface and then transferred to the buffer. Before the next eight-word transfer of data is received, at least one bus idle cycle is guaranteed. During this bus idle cycle, no data will be transferred. This time is used to determine whether the read and write counters contain the same addresses, and if not, to report the occurrence of a glitch on the data strobe.

According to another aspect of the current invention, the bus idle cycle is also used to synchronize the read and write addresses. This is accomplished by transferring the contents of the write counter to the read counter. In this manner, if a glitch occurs so that the write counter is incremented erroneously, the read counter will now be at that same incremented value. When a next data transfer begins, the write counter address used to store the data to the input storage device is now the same address used to retrieve that data from the input storage device, and the data will not be corrupted.

Because the current invention synchronizes the read and write addresses during each bus idle cycle that separates data transfers, any glitches occurring on the data strobe at the end of a data transfer will be transparent to system operation. In other words, even if the write counter is erroneously incremented because of a glitch after the last edge of the strobe accompanying the data transfer, that glitch will not result in data corruption because the write counter will be synchronized to the read counter before the write address is again used to perform the next data transfer. As discussed above, this synchronization occurs when the bus idle cycle is detected, which occurs following receipt of the last edge of the strobe.

The foregoing describes that if a glitch occurs on, or after, the last edge of the data strobe for a given data transfer, the current invention will provide complete recovery so that no data corruption will occur. If the glitch occurs during a data transfer, however, complete recovery will not be guaranteed. This is because the data transfer must complete before the read and write addresses are again synchronized during the next bus idle cycle. During this time, parity errors will be detected on this data, since an attempt is being made to read data from a different address than that to which it was stored. When the next bus idle cycle arrives, the glitch will be detected in the aforementioned manner. The detection of the parity error(s) in conjunction with glitch detection will prompt an appropriate recovery action.

The above discussion describes the capture of data using a strobe provided along with the data. According to another embodiment of the invention, each data transfer is accompanied by two data strobes, a P and an N strobe. Each such strobe has a frequency that is twice that of the internal clock. Each strobe is used to capture half of the data provided with the transfer. Each strobe is associated with dedicated read and write counters so that glitch detection and recovery can be performed for each strobe in the manner discussed above.

As described above, the current invention provides the capability to synchronize data read and write counters during idle cycles of the bus. This is not only useful for synchronization between data transfers, but also prior to the start of data transfers. For instance, in one embodiment, the write counters are not set to any predetermined address following system reset because of a design requirement related to limiting the addition of logic within clock paths. This design requirement allows the write counters to point to any address within the input storage device following reset. As long as the read counters are synchronized with the write counters prior to the start of operation, this will not affect system functions. According to the invention, this synchronization will occur during a bus idle cycle following reset and prior to receipt of the first data transfer.

According to another aspect of the invention, the glitch recovery mechanism of the current invention may be disabled. This may be accomplished in one embodiment using programmable logic that is set via either an out-of-band or an in-band Configuration and Status Register (CSR) ring, as is known in the art. The glitch detection mechanism may likewise be separately disabled using similar programmable logic. In this manner, either or both of the glitch recovery and detection mechanisms may be selectively disabled.

According to one embodiment of the invention, a system having a receiver to receive data from an interface is disclosed. The data is captured using a data strobe provided with the data. In particular, write select logic is included that uses predetermined edges of the data strobe to generate addresses to a storage device of the receiver. These are the addresses within the storage device to which the data will initially be stored. Read control logic is coupled to receive from the write select logic one of the generated addresses. This received address is used to generate addresses within the storage device from which the data is to be retrieved. Compare logic coupled to the read control logic compares a predetermined one of the addresses generated by the write select logic to a predetermined one of the addresses generated by the read control logic. The results of this comparison is used to detect whether a glitch occurred on the data strobe.

A method of receiving data by a receiver from an interface is also described. This method employs a strobe provided with the data to initially capture the data. The method includes using the strobe to generate one or more write addresses, using the strobe and the write addresses to capture the data within a storage device of the receiver, and using a clock internal to the receiver to generate one or more read addresses for use in retrieving the data from the storage device. This method also comprises determining whether a predetermined one of the read addresses is the same as a predetermined one of the write addresses, and if not, providing an indication that a glitch occurred on the strobe.

According to another embodiment, a system for receiving data from an interface by a receiver is disclosed. The system employs a strobe provided with the receiver to receive the data. This system includes write select means for using a predetermined edge of the strobe to generate write addresses, the write select means further for using the predetermined edge of the strobe and the write addresses to transfer the data from the interface to a storage device of the receiver. The system further comprises read control means for using a clock signal internal to the receiver to generate read addresses for use in reading the data from the storage device. Compare means is provided for comparing at least one of the read addresses to at least one of the write addresses, and to thereby determine whether a glitch occurred on the strobe.

Other scopes and aspects of the invention will become apparent from the Drawings and the detailed discussion of the invention set forth below.

BRIEF DESCRIPTION OF THE DRAWINGS

FIGS. 7A and 7B, when arranged as shown in FIG. 7, are a timing diagram illustrating operation of the invention when a glitch occurs on the last trailing edge of the P strobe following a data transfer.

DETAILED DESCRIPTION OF THE DRAWINGS

Figure 1:
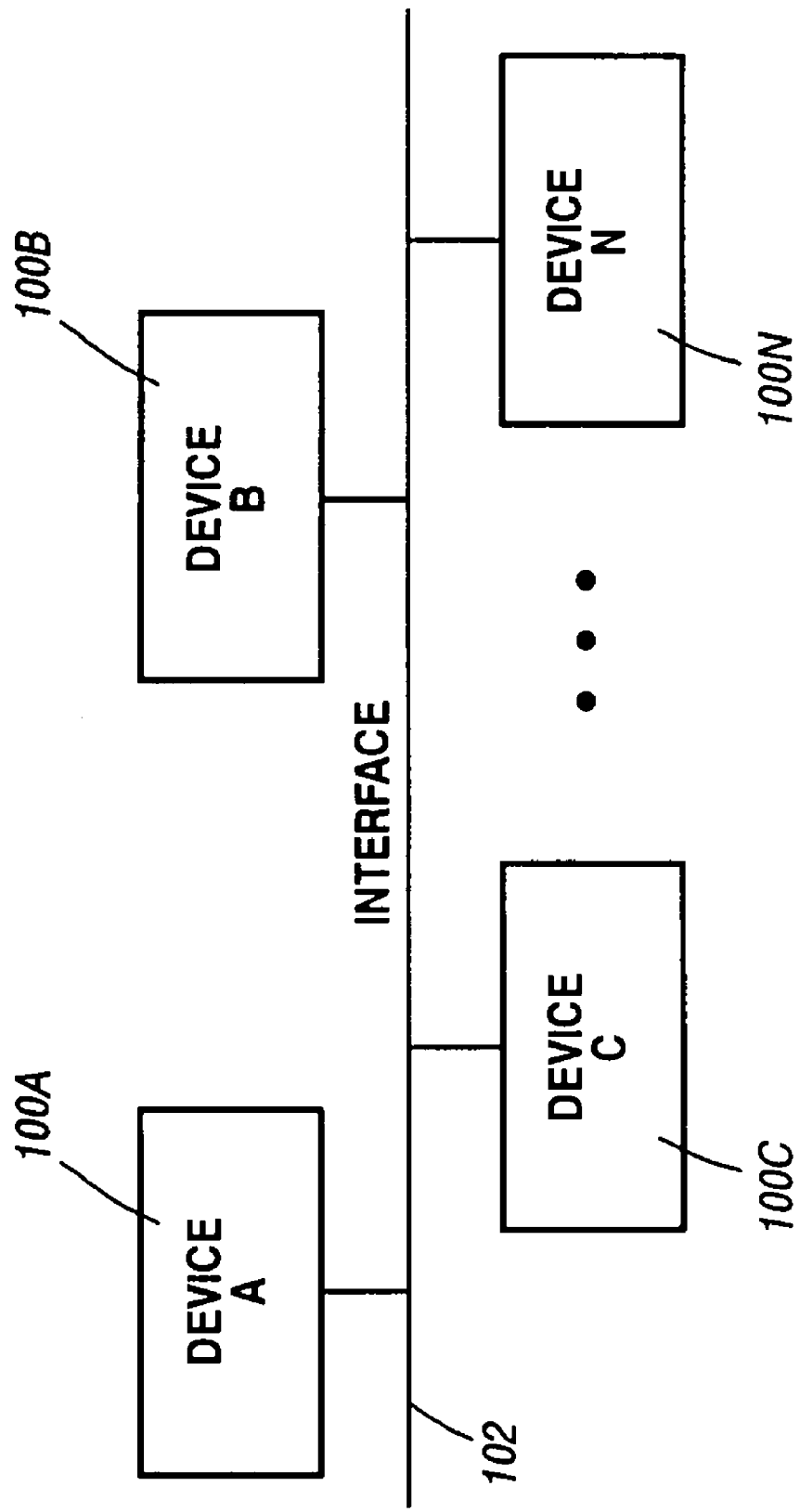
FIG. 1 is a block diagram of a type of data processing system configuration that may take advantage of the current invention.

FIG. 1 is a block diagram of a type of data processing system configuration that may take advantage of the current invention. Each of devices 100A-100N is coupled to a common interface 102. Any of devices 100A-100N that is capable of operating as a transmitter may transfer signals via interface 102 to any other of these devices that is capable of operating as a receiver.

One way to capture data at the receiver is to employ an internal clock that is synchronized with an internal clock of the transmitter. To accommodate this configuration, the transmitter must provide the data so that it is guaranteed to be stable at the receiver during a predetermined edge of the clock. This becomes increasingly difficult at higher transfer rates when the latency imposed by the interface becomes more of a factor.

One technique used to facilitate higher data transfer rates without increasing clock frequency is to require the transmitter to provide a strobe along with the data. Assuming the transmitter properly synchronizes an edge of the strobe with the data, and the strobe and data experience approximately the same latency across the interface, the strobe will likely be acceptably synchronized with the data at the receiver. A predetermined edge of the strobe may therefore be available for use by the receiver in capturing the data. Such a technique allows for two or more data transfers within a single clock cycle.

For a strobe to be effectively utilized in capturing data, it must be free of glitches, such as the ones caused by signal reflections on imperfectly terminated printed-circuit board (PCB) interfaces. If such glitches are large enough to trigger state devices, the data may become corrupted at the receiver. This is particularly problematic if a backup copy of the data does not exist. In this case, a fatal error may occur, and a system stop may be needed. The current invention provides a way to detect and recover from such glitches on strobe signals, as will be described below.

Figure 2:
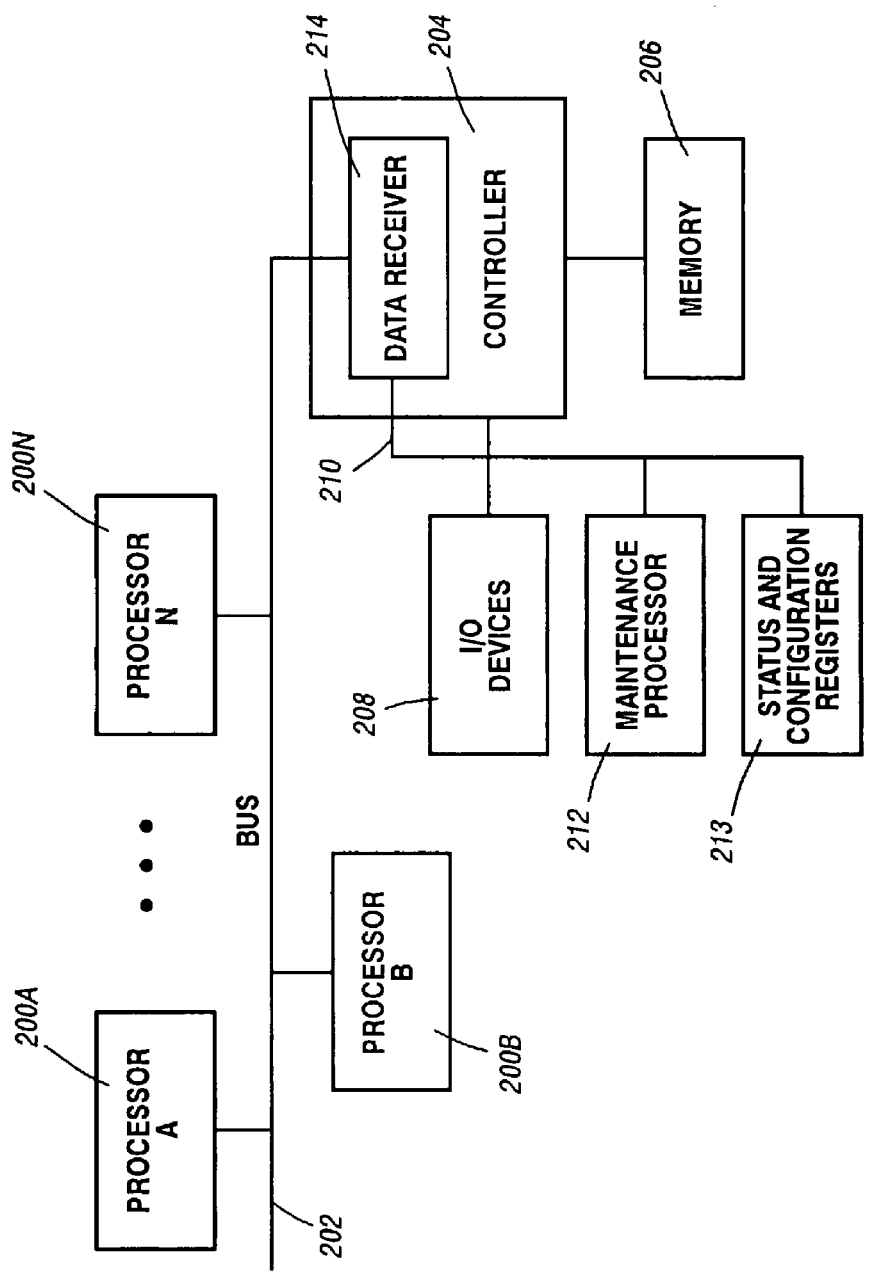
FIG. 2 is a block diagram of a more specific embodiment of a system that may utilize the current invention.

FIG. 2 is a block diagram of a more specific embodiment of a system that may utilize the current invention. In this embodiment, multiple processors 200A-200N are coupled to a bus interface 202. These processors may be of a type commercially available from Intel Corporation, Unisys Corporation, or some other entity. Each of the processors may be provided within a respective package. Alternatively, multiple processors may reside within a single package. In one specific embodiment, the processors are those available from Intel Corporation, and bus interface 202 is a front-side bus adapted for operation with the Intel processors.

Another device that is coupled to bus 202 is shown as controller 204, which includes memory controller logic to interface with, and control, memory 206. Other logic is provided to interface with, and control, I/O devices 208. Controller 204 may further be coupled via a maintenance interface to a maintenance processor 212. Maintenance processor may be used to perform initialization, recovery, maintenance, and other system functions for the system. The maintenance interface may include, or be coupled to, a Control and Status Register (CSR) ring, a dynamic scan interface, a static scan interface, and/or other maintenance interfaces in a manner known in the art.

The maintenance interface 210 may further be coupled to status and configuration registers 213, which are registers that may be both read from and written to by maintenance processor 212. Status and configuration registers 213 may be used to control selectable functions of the system as well as to capture status and error indicators, as will be described below.

Controller 204 includes data receiver 214 that receives various signals from bus 202. In particular, data receiver 214 receives and captures data signals that may be transmitted by any of processors 200A-200N. When a processor transfers data signals, those signals are accompanied by at least one data strobe that is also provided by the processors. In one specific implementation, two data strobes are provided to capture the data in the above-described manner. Other signals, such as a Data Ready ("DRDY") signal are also transmitted with the data to provide synchronization and control functions as will be discussed further below.

Figure 3:
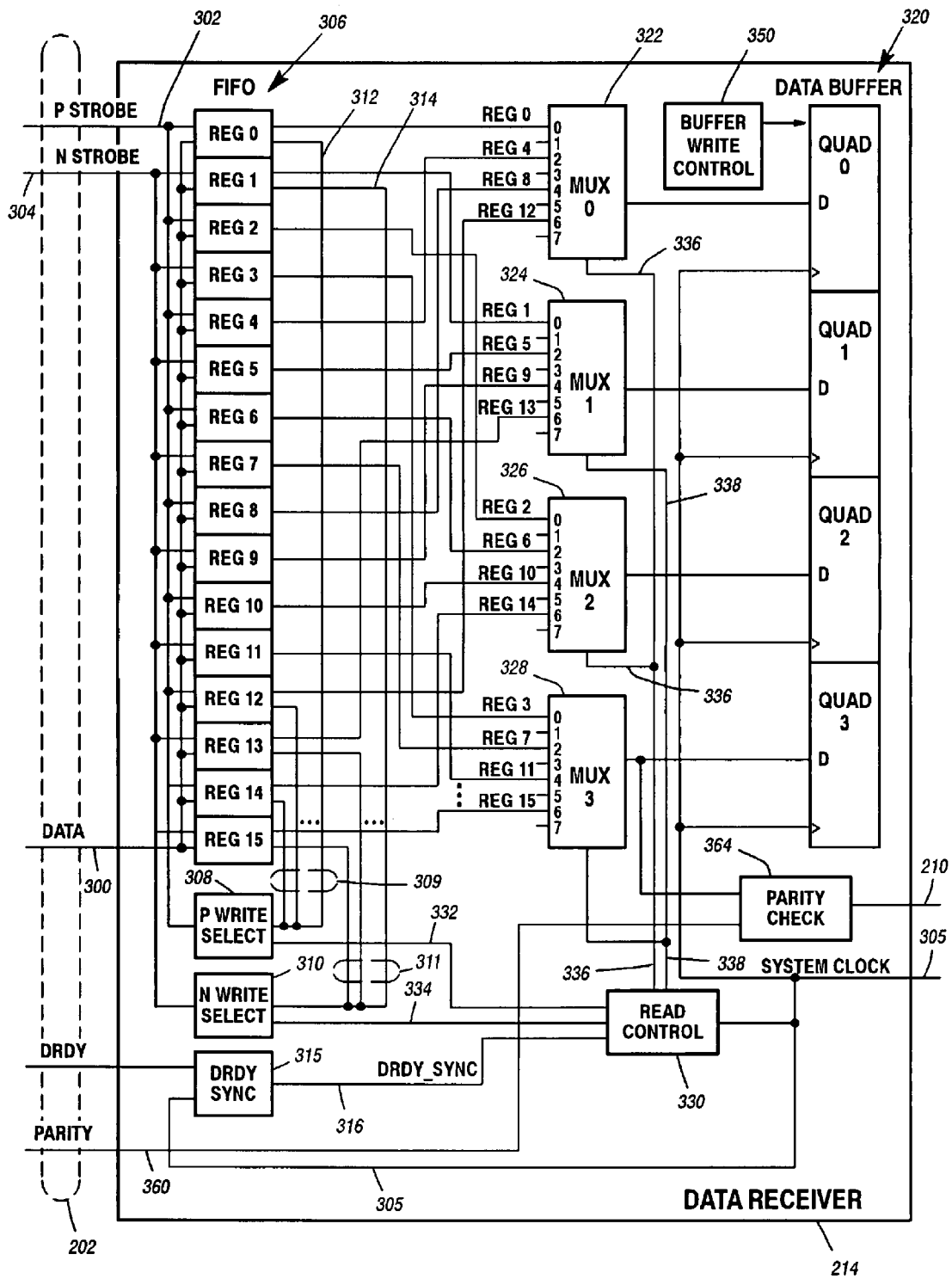
FIG. 3 is a block diagram of the data receiver of FIG. 2.

FIG. 3 is a block diagram of data receiver 214. This circuit receives signals from bus 202 (shown dashed). These signals include data 300 and two data strobes, shown as P strobe 302 and N strobe 304. In this embodiment, the P and N strobes are inverses of one another, and operate at twice the frequency of a system clock signal 305. This allows for four data transfers within a single clock cycle. The system clock 305 is a clock signal that is provided to both controller 204 and each of processors 200A-200N for use by internal logic, and to synchronize transfers occurring on bus 202.

According to one implementation, data is received from the bus in transfers that each includes eight words of data. Each transfer is separated by one "dead" cycle wherein no data is transferred. Following this dead cycle, another transfer may be initiated. Other implementations are possible within the scope of the current invention. For instance, in other embodiments, data transfers may be comprised of any other units of data, including one or more bits, one or more bytes, multiple words, and so on. Moreover, each transfer may include more, or fewer, units of data.

Data received from bus 202 on lines 300 is captured into a FIFO 306, which is shown to include registers 0-15. Physically, this FIFO may be arranged as two eight-word FIFOs, one sixteen-word FIFO, or in some other configuration. In a different implementation involving data transfers of a different size, the FIFO may include more or fewer registers.

As discussed above, data is captured into FIFO using the P and N strobes. In particular, the P strobe is provided to each of the even-numbered registers of the FIFO, including registers 0, 2, 4 and so on, through register 14. Similarly, the N strobe is provided to each of the odd-numbered registers, including registers 1, 3, 5, and so on, through register 15. In both cases, in the current embodiment, the falling edge of the P and N strobe is used to capture data into an enabled one of the registers of the FIFO.

Each register of the FIFO is enabled by a respective write enable signal. The even-numbered registers receive a write enable signal from P write select logic 308. For example, P write select logic 308 provides enable signal 312 to FIFO register 0. When activated, this write enable signal allows register 0 to capture data upon receipt of the next falling edge of P strobe 302.

In a manner similar to the foregoing, the odd-numbered registers receive a respective write enable signal from N write select logic 310. For instance, N write select logic 310 provides enable signal 314 to FIFO register 1. When this signal is activated, register 1 captures the data at its input upon receipt of the next falling edge of the N strobe 304. Although not all enable signals are shown in FIG. 3 for ease of reference, it will be understood that each register of the FIFO receives a respective enable signal from an appropriate one of either the P or N write select logic.

As will be readily appreciated, the sixteen-word FIFO 306 is capable of storing two complete eight-word data transfers. This occurs generally as follows. In preparation for receipt of a first data transfer, both P write select logic 308 and N write select logic 310 generate enable signals. In particular, the P write select logic 308 generates an enable signal to register 0 of FIFO 306, and N write select logic 310 generates an enable signal to register 1. These signals are shown on lines 312 and 314, respectively, as discussed above.

Sometime thereafter, the data arrives at data receiver 214 along with an active DRDY signal on bus 202 that indicates valid data is being transferred. At this time, register 0 of FIFO 306 has been enabled to receive data by enable signal 312. As a result, the first falling edge of the P strobe 302 that follows receipt of the DRDY signal captures the first word of data provided on lines 300 into register 0 of FIFO 306. The same falling edge of the P strobe 302 causes P write select logic 308 to generate an enable signal (not shown for ease of reference) to register 2. This causes the next falling edge of the P strobe 302 to capture another word of data into register 2, and so on In a similar fashion, the first falling edge of the N strobe 304 that follows receipt of DRDY captures the second word of data received on lines 300 into register 1 of FIFO 306, which was previously enabled to receive the data by the enable signal 314. The same falling edge of the N strobe 304 causes N write select logic 310 to generate an enable signal (not shown for ease of reference) to register 3. This, in turn, causes the next falling edge of the N strobe 304 to capture another word of data into register 3, and so on. In this manner, all eight words of a data transfer are successively captured into registers 0-7 of FIFO 306 by respective falling edges of an applicable one of the P or N strobes.

A dead cycle follows completion of a first eight-word data transfer. Then the process described above is repeated for a second eight-word data transfer that is accompanied by activation of the DRDY signal. This second transfer occurs in a similar manner. That is, both P write select logic 308 and N write select logic 310 generate enable signals that are provided to registers 8 and 9 of FIFO 306 respectively. The first falling edge of the P strobe 302 after activation of DRDY causes the first word of the second transfer to be captured into register 8. The first falling edge of the N strobe 304 that follows receipt of DRDY causes the second word of the second transfer to be captured into register 9, and so on. In this manner, all eight words of the second data transfer are captured within registers 8-15 of the FIFO.

As discussed above, during any data transfer, the DRDY signal of bus 202 is activated prior to arrival at the receiver of the first word of data. This indicates to the receiver that the data is about to arrive. This signal is captured by DRDY sync logic 315 via system clock 305 to generate a synchronized DRDY_SYNC signal on line 316 that will be used in a manner to be discussed below.

While a second data transfer is being captured in FIFO 306 in the above-described manner, the data from the first data transfer is being read from registers 0-7 of the FIFO into a data buffer 320. According to the current implementation, this occurs using four eight-to-one multiplexers 322-328.

Multiplexers 322-328 are controlled using select signals generated by read control logic 330. Specifically, read control logic 330 receives as input the DRDY_SYNC signal 316, as well as control signals 332 and 334 from P write select logic 308 and N write select logic 310, respectively, as is described in detail below. Read control logic 330 further receives the internal clock signal 305. Using these signals, read control logic 330 generates two select signals. A first select signal 336, referred to hereinafter as the P strobe read address, is provided to multiplexers 322 and 326. A second select signal 338, referred to hereinafter as the N strobe read address, is provided to multiplexers 324 and 328. These signals are used to control the transfer of data from the FIFO 306 into data buffer 320. During a "normal" transfer, this occurs generally as follows.

Upon receipt of DRDY_SYNC 316 and valid signals from P write select 308 on lines 332 in a manner to be described below, read control logic 330 generates the P strobe read address. This P strobe read address is presented on lines 336 to cause multiplexers 322 and 326 to select the data available on the "0" inputs of these devices. Similarly, receipt of DRDY_SYNC 316 and valid signals from N write select logic 310 on lines 334 cause read control logic 330 to generate the N strobe read address signal. This N strobe read address is provided on lines 338 to cause multiplexers 324 and 328 to likewise select the data presented on their "0" inputs.

As shown in FIG. 3, the "0" inputs of multiplexers 322-328 are coupled to the outputs of registers 0-3 of FIFO 306, respectively. Thus, the P and N strobe read addresses of "0" cause the contents of FIFO registers 0-3 to be transferred to the outputs of multiplexers 322-328, respectively. As this data becomes available on multiplexer outputs, a next rising edge of system clock signal 305 captures the data into data buffer 320 under control of the buffer write control logic 350. In this manner, buffer write control logic 350 individually controls each of four sections, or "quads", of the data buffer to latch an appropriate one of the words of a transfer into a desired address of the data buffer 320. Four words are captured each clock cycle to match the data input rate to the FIFO, which occurs at four times the system clock rate.

After the first four words of the data transfer have been stored within data buffer 320, read control logic 330 generates new P and N strobe read signals on lines 336 and 338, respectively. For reasons to be described below, these read signals are incremented by "2" such that they next select inputs "2" for each of the multiplexers. These inputs of multiplexers 322-328 are coupled to the outputs of registers 4-7, respectively, as shown in FIG. 3. As a result, the last four words of the first data transfer are latched into a next address of data buffer 320 under the control of buffer write control logic 350.

After all data from the first transfer is transferred from FIFO 306 to data buffer 320, read control logic 330 repeats this process for the eight words of the next transfer. That is, read control logic 330 uses signals received on lines 332 from P write select logic 308 to generate the next P strobe read address on lines 336. Likewise, read control logic 330 further uses signals received from N write select logic 310 to generate the next N strobe read address on lines 338.

In accordance with the current example, it will be assumed that both the P and N strobe read addresses have been incremented from "2" to "4". This causes multiplexers 322-328 to select inputs "4" such that the contents of registers 8-11 are transferred to data buffer 320 under the control of buffer write control logic 350. Finally, read control logic 330 provides P and N strobe read address signals on lines 336 and 338 that have been incremented by "2". This selects inputs "6" of each of the multiplexers so that the contents of FIFO registers 12-15 is transferred to, and stored in, data buffer 320.

In the above-described manner, data transferred on bus 202 is captured using P and N strobes. This data is then transferred to a data buffer via an internal clock. The success of this operation depends on the strobes being noise-free such that no false clock edges are detected by the data receiver. The detection of such edges results in complications, as will be discussed further below.

Data receiver 214 provides parity protection on the received data. Specifically, as data is being transferred from the multiplexers to data buffer 320, that data is also provided to parity check logic 364. For ease of reference, FIG. 3 shows parity check logic 364 receiving data only from multiplexer 328. However, it will be understood that the parity check logic receives data from the other multiplexers as well. This received data is checked for parity errors using parity bits received on lines 360 from bus 202. If parity check logic 364 determines that a parity error has occurred on data being transferred by any of the multiplexers, parity error signals are generated. These parity error signals are forwarded on interface 210 to status and configuration registers 213 (FIG. 2).

As discussed above, in one embodiment, status and configuration registers 213 are accessible via a CSR ring controlled by interface 210 of FIG. 2. Using the CSR ring to read registers 213 in a manner known in the art, maintenance processor 212 may detect the presence of the parity error and initiate the appropriate recovery action. Alternatively, system hardware may be provided to automatically detect this error and reboot the system. In this alternative embodiment, the maintenance processor may then initiate an appropriate recovery action based on the error following completion of the reboot. In yet another implementation, following completion of the automated re-boot operation, a system processor will report the error and initiate an appropriate recovery action. A system processor is one of the IPs 200A-200N that has been assigned to perform maintenance and system tasks by the operating system. Recovery actions are discussed further below. Returning now to FIG. 3, it will be noted that this diagram depicts multiplexers 322-328 as though many of the inputs are not connected to signals. For instance, multiplexer 322 is depicted as though inputs "1", "3", "5", and "7" are not coupled to receive any signals. This is for ease of reference only. The manner in which these inputs are connected will be discussed in detail below in reference to glitch detection and recovery.

Figures 4, 4A:
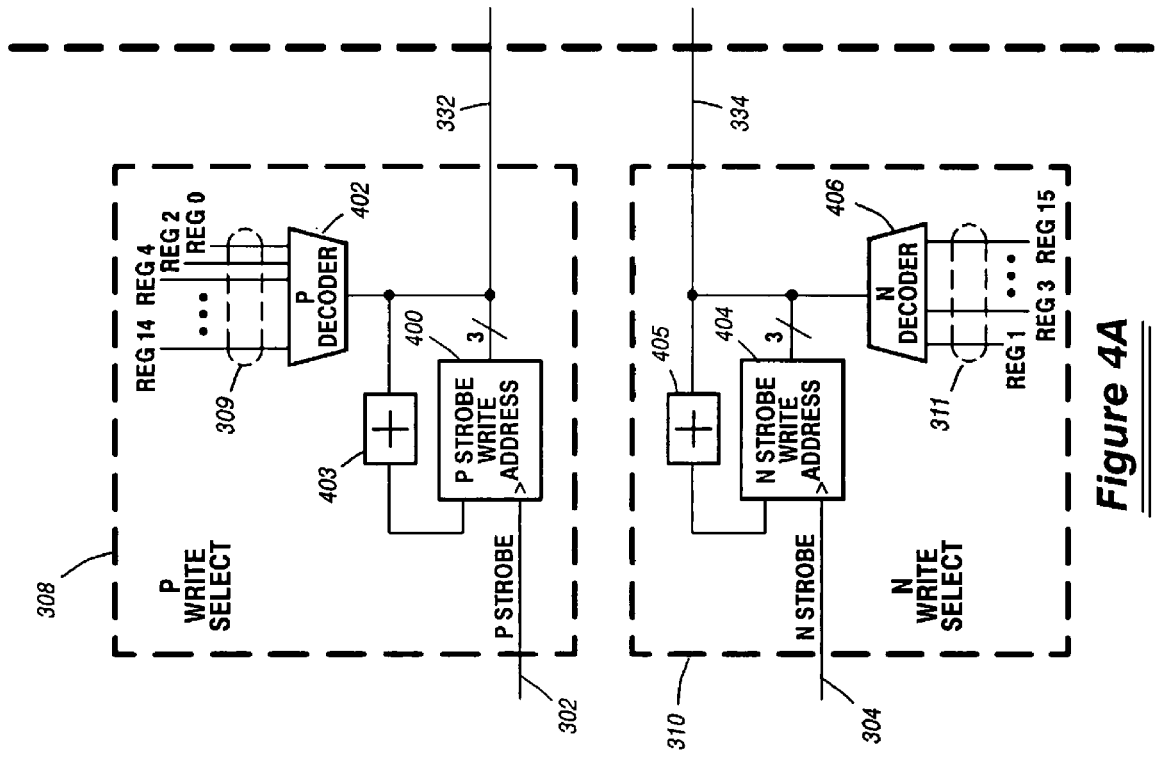
FIGS. 4A and 4B, when arranged as shown in FIG. 4, are a logic block diagram illustrating the P write select, N write select, and read control logic of FIG. 3 in more detail.
Figure 4B:
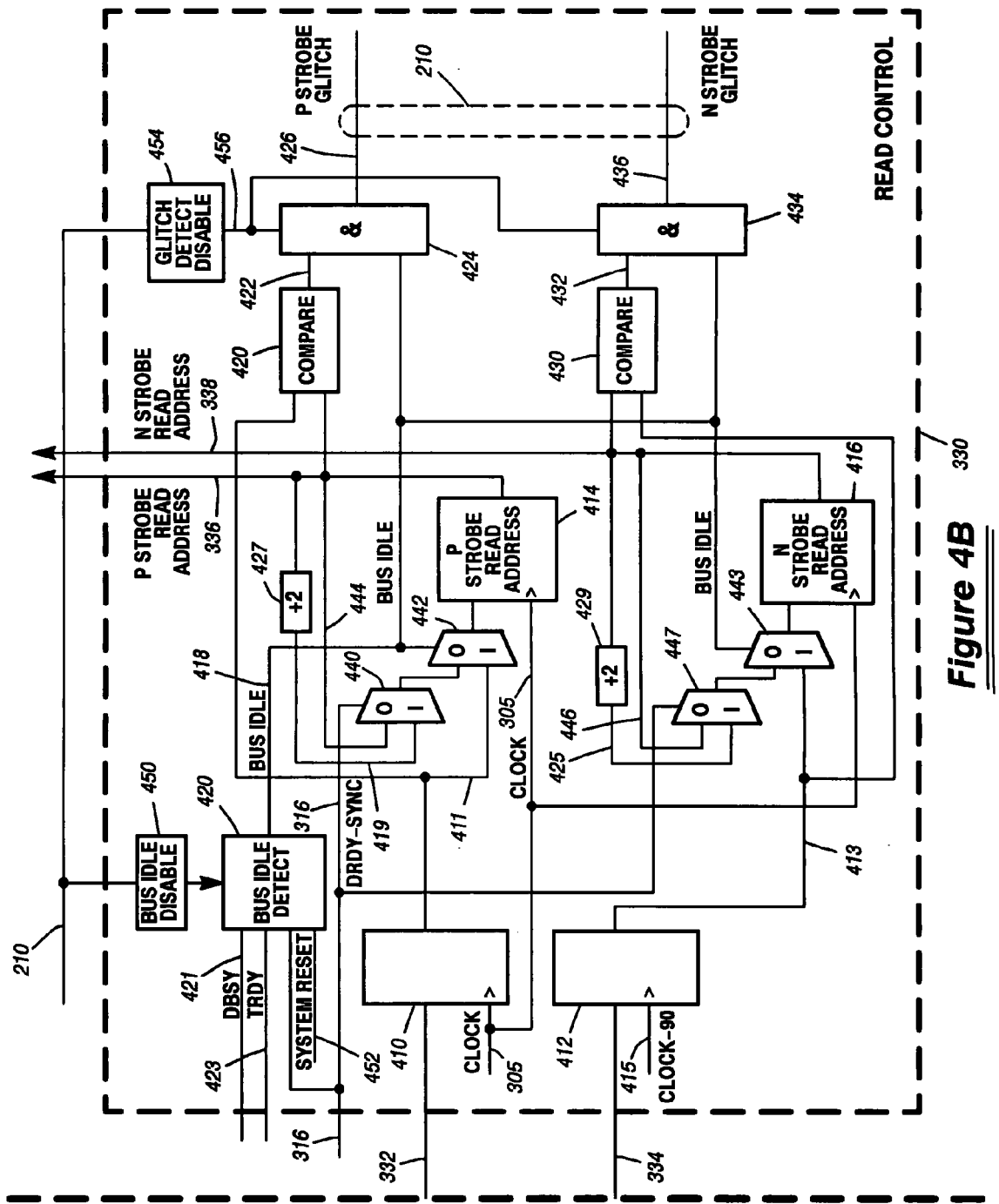

FIGS. 4A and 4B, when arranged as shown in FIG. 4, are a logic block diagram illustrating the P write select, N write select, and read control logic of FIG. 3 in more detail. As discussed above, the P write select logic 308 (shown dashed) generates the write enables for the eight even-numbered registers 0 through 14 of FIFO 306 (FIG. 3). This is done using a three-bit counter 400. For purposes of this discussion it is assumed this counter is set to zero at the start of a first data transfer even though this need not be the case, as will be discussed below. This counter is clocked by the falling edge of P strobe 302, which increments the counter by "one", as indicated by block 403.

The contents of the counter 400 are used as an encoded address for the even-numbered registers of FIFO 306. This address is referred to herein as the P strobe write address. The P strobe write address is provided to decoder 402, which generates the enables for the even-numbered registers. These enable signals, which are collectively shown (dashed) as signals 309, include register 0 enable, register 2 enable, register 4 enable, and so on, through register 14 enable. As previously mentioned, these signals enable the writing of a corresponding one of the even-numbered registers of FIFO 306.

In a similar manner, a three-bit counter 404 is provided to generate an encoded register address for the odd-numbered registers of FIFO 306. The contents of counter 404 are referred to herein as the N strobe write address. This address is incremented by "one" by a negative edge of N strobe 304, as represented by block 405. Decoder 406 decodes the N strobe write address on the output of counter 404 to generate signals 311 (shown dashed), which include register 1 enable, register 3 enable, register 5 enable, and so on, through register 15 enable.

It is assumed for purposes of the current discussion that at the start of a new transfer, P counter 400 will be pointing to either register 0 or register 8 of FIFO 306, and that N counter 404 will be pointing to either register 1 or register 9 of the FIFO. As will be discussed below, however, this need not be the case.

The P and N strobe write addresses are provided by counters 400 and 404, respectively, on lines 332 and 334 to read control logic 330 (shown dashed) of FIG. 4B. The P strobe write address on lines 332 is clocked into register 410 by clock signal 305. Similarly, the N strobe write address on lines 334 is clocked into register 412 by a clock signals that is phase-shifted from clock signal 305 by 90 degrees (shown as "clock 90"). These latched P and N strobe write addresses are used by read control logic 330 to generate the P and N strobe read addresses, as follows.

Read control logic 330 includes counters 414 and 416 that store the P and N strobe read addresses, respectively. As discussed in relation to FIG. 3, these read addresses are provided to multiplexers 322-328 to control which data is transferred from the FIFO 306 to data buffer 320.

Counters 414 and 416 are periodically loaded from registers 410 and 412, respectively. This causes the P and N strobe read addresses to be synchronized with the P and N strobe write addresses. Specifically, this synchronization occurs when bus idle detect logic 420 provides a high-active bus idle signal on line 418 to thereby indicate that the data bus is idle. In one embodiment, this signal is generated based on the idle bus conditions defined by the Intel Front-Side Bus Specification promulgated by Intel Corporation. As is known in the art, such idle bus conditions take into account the states of the DRDY_SYNC signal 316, a TRDY signal 423, a DBSY signal 421, and other signals that are driven by either the transmitting or receiving entity on the bus. This is largely beyond the scope of the present invention. What is important to note is that as long as a valid data transfer is neither presently occurring nor imminent, the bus 202 is considered "idle" such that the bus idle signal on line 418 will be high activate. The presence of this high-active bus idle signal on line 418 configures multiplexer 442 so that counter 414 receives its input on lines 411 from register 410. Similarly, the bus idle signal configures multiplexer 443 so that counter 416 receives its input on lines 413 from register 412.

When a valid data transfer is occurring, several signals are activated that cause counters 414 and 416 to receive their inputs from a different path. In particular, at the start of a data transfer, the low-active DRDY signal is received by the DRDY sync logic 315 (FIG. 3), as discussed above. This signal is clocked by system clock 305 to generate the DRDY_SYNC signal 316 that is shifted in time by two cycles of clock signal 305. This will be discussed further below in regards to the timing of the circuit of FIG. 4.

In addition to activation of the DRDY signal, several other signals are received from bus 202 in one embodiment of the invention, as discussed above. This includes the TRDY 423 and DBSY signals 421. In a manner beyond the scope of the current invention, these signals are used by the bus idle detect logic 420 to determine that the bus is no longer idle, and to thereby deactivated bus idle signal 418.

Deactivation of high-active bus idle signal 418 and activation of the DRDY_SYNC 316 causes counter 414 to receive its input from path 419. Similarly, counter 416 will receive its input from path 425. As a result, the contents of both counters will be incremented by "two" upon receipt of the next rising edge of clock 305, as indicated by incrementation logic in blocks 427 and 429. In this manner, the counters will be incremented by "two" upon each rising edge of the system clock 305 while the bus idle signal 418 is deactivated and the DRDY_SYNC signal 316 is activated.

The foregoing describes how counter 414 is loaded from register 410 while the bus idle signal 418 is activated, and is instead loaded from incrementation path 419 while the bus idle signal is deactivated. There is yet another feedback path 444 from which counter 414 may be loaded. Feedback path 444 is provided to account for delayed data transfers, as follows.

In one embodiment of the invention, bus 202 is an interface that conforms to Intel processor specifications such as the Intel Front-Side Bus Specification that supports delayed data transfers. This means that a processor may assert DBSY 421 based on observing TRDY 423 in preparation to initiate a data transfer. In accordance with the Front-Side Bus Specification, activation of DBSY 421 causes the bus idle signal 418 to be deactivated. This indicates to the controller 204 that a data transfer is imminent. However, the processor need not transfer the data immediately. Until the data transfer occurs, DRDY remains deactivated even though the bus idle signal 418 is also deactivated. This is known as a data stall.

Until data is actually being transferred to data receiver 214 as indicated by activation of DRDY and DRDY_SYNC 316, the P and N strobe read addresses contained within counters 414 and 416 should not be incremented. Instead, these addresses should remain at their current values. To accommodate this, path 444 is provided for counter 414. This path is selected when both the bus idle signal 418 and the DRDY_SYNC signal 316 are both deactivated, thereby allowing the contents of counter 414 to remain unchanged. A similar path 446 is provided for counter 416. When DRDY is finally activated, incrementation of the P and N strobe read addresses will be initiated.

As previously discussed, the contents of counters 414 and 416 provide the P and N strobe read addresses which are provided to the multiplexer on lines 336 and 338, respectively. Because counters 414 and 416 are incremented by "two", as represented by blocks 427 and 429 of FIG. 4, the P strobe read address on lines 336 first selects the "0" inputs of multiplexers 322 and 326, followed by selection of inputs "2", "4", and so on. Likewise, the N strobe read address on lines 338 selects the "0" inputs of multiplexers 324 and 328, followed by selection of "2", "4", and so on. This pattern will change if a glitch is detected on either the P strobe or the N strobe, as is discussed below.

The read control logic 330 further includes glitch detection capabilities provided by compare circuits 420 and 430 and the related circuitry. This provides for the detection of glitches occurring on either the P strobe 302 or the N strobe 304. This will be discussed in detail below. Finally, read control logic 330 also includes bus idle disable logic 450 and glitch detects disable logic 454 to disable the glitch detection and recovery mechanisms provided by the current invention. The operations of these circuits are described further below following a detailed discussion of glitch detection and recovery.

Figure 5:
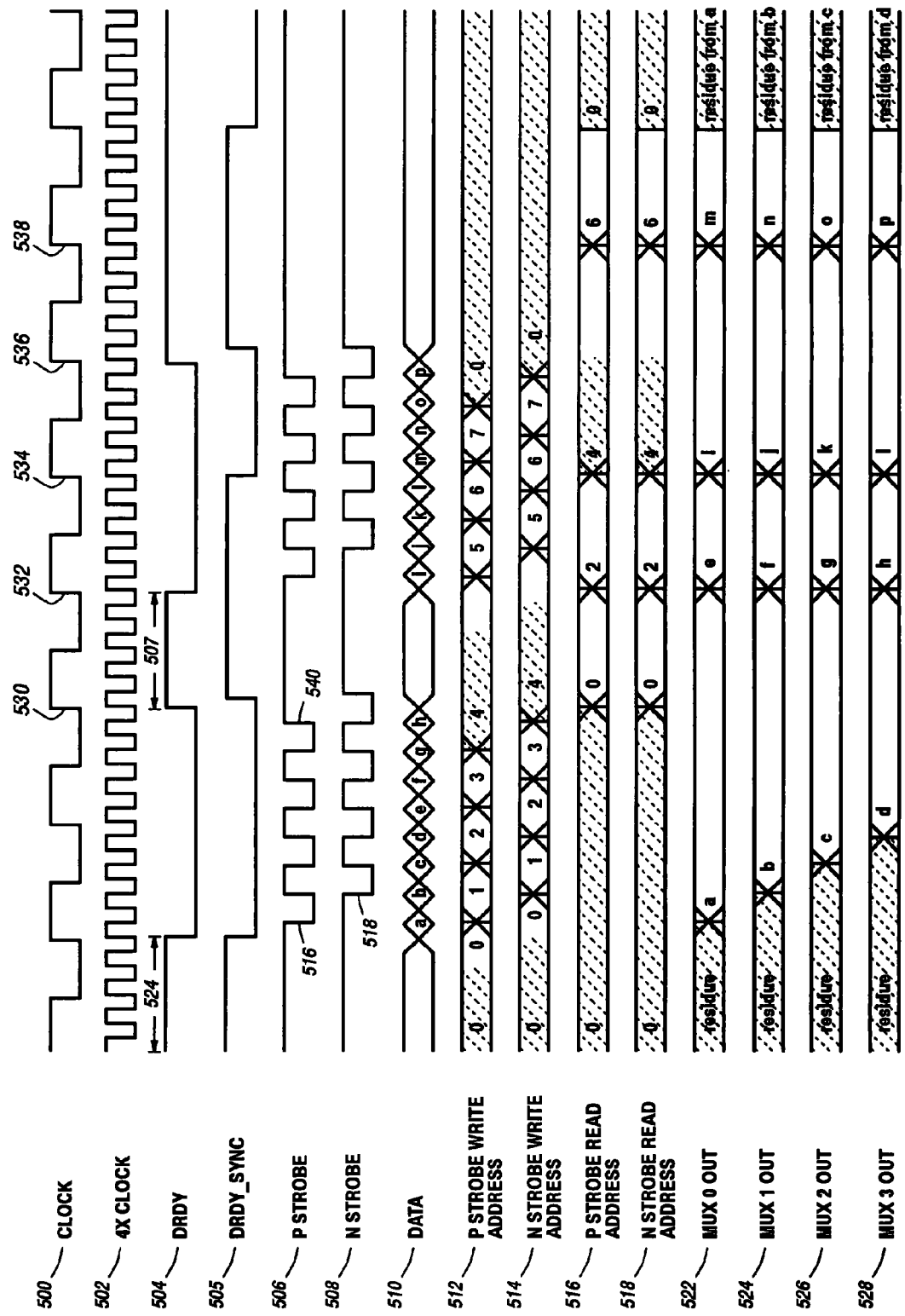
FIG. 5 is a timing diagram illustrating the manner in which two sequential data transfers occur within the embodiment of the system shown in FIGS. 3 and 4 when no glitches occur on either the P or N strobes.

FIG. 5 is a timing diagram illustrating the manner in which two sequential data transfers occur within the embodiment of the system shown in FIGS. 3 and 4 when no glitches occur on either the P or N strobes. Waveform 500 represents the internal clock signal 305 (See FIG. 3). In one embodiment, this clock signal is provided to each of the devices on bus 202, including processors 200A-200N, as well as controller 204. Waveform 502 illustrates a 4× clock signal having a frequency of four times the internal clock signal 305.

Waveform 504 shows DRDY, which is asserted low-active by the processor that is transferring the data to indicate that a data transfer is occurring. As discussed above, DRDY sync logic 315 shifts the DRDY signal by two cycles of clock signal 305 (waveform 500) to generate a high-active DRDY_SYNC signal shown in waveform 505.

Waveforms 506 and 508 illustrate the P strobe 302 and N strobe 304 signals, respectively. Recall that the falling edges of these signals are used to capture data by data receiver 214. The data is represented by waveform 510. This waveform shows eight words "a" through "h" being provided during a first data transfer, and eight additional words "i" through "p" being provided during the second transfer. These two transfers are separated by a "dead" cycle 507 illustrated in relation to waveform 504. During this dead cycle, DRDY assumes the inactive state.

Waveform 512 illustrates the P strobe write address contained within counter 400 (FIG. 4). This address is driven onto lines 332 for use in generating the write enable signals 309 provided to the even-numbered FIFO registers (FIG. 3). Similarly, waveform 514 illustrates the contents of the N strobe write address counter 404. These contents are driven onto lines 334 for use in generating the write enable signals 311 to the odd-numbered FIFO registers.

According to the scenario of FIG. 5, the P strobe write address of "0" becomes available sometime before edge 516 of the P strobe (waveform 506). This address will enable word "a" to be clocked into register 0 of FIFO 306 upon receipt of edge 516 of the P strobe. Similarly, the N strobe write address "0" that becomes available sometime before edge 518 of the N strobe (waveform 508) will enable word "b" to be clocked into register 1 of FIFO 306 by edge 518 of the N strobe. In a similar manner, each of the eight data words of the first transfer is clocked into a respective one of the FIFO registers 0-7 as enabled by a corresponding P or N strobe write address.

Next, the timing of the P strobe read address 336 and N strobe read address 338 signals are considered. These signals, which are represented by waveforms 516 and 518, respectively, somewhat track the P strobe write address and N strobe write address signals of waveforms 512 and 514, respectively. This occurs as follows. As discussed in reference to FIG. 4, an idle bus cycle such as the one that occurs during time 524 (waveform 504) allows the P strobe write address contained within counter 400 (FIG. 4) to be transferred first to register 410, and from there to counter 414. Thus, the initial value of the P strobe read address contained within counter 414 tracks the initial value of the P strobe write address in counter 400. As late as clock edge 530 (waveform 500), the initial P strobe write address of "0" (waveform 512) is still being clocked into counter 414, as shown by waveform 516. This occurs even though the P strobe write address in counter 400 has already incremented to "4" because the intermediate register 410 is providing the input to counter 414.

In a similar manner, an idle bus cycle 524 (waveform 504) allows the N strobe write address contained within counter 404 (FIG. 4) to be transferred first to register 412, and from there to counter 416. Thus, the initial value of the N strobe read address contained within counter 416 tracks the initial value of the N strobe write address in counter 404. This occurs up through clock edge 530 of system clock signal 305.

Sometime shortly after edge 530 of the system clock 305, the high-active DRDY_SYNC signal 316 (FIG. 3) is activated, as represented by waveform 505. Recall that DRDY_SYNC signal 316 lags the DRDY signal (waveform 504) by two cycles of clock 305 (waveform 500.) Activation of DRDY_SYNC signal 316 causes counter 414 to receive input from the increment path 419 (FIG. 4) rather than from register 410. Likewise, register 416 receives its input on path 425 rather than from register 412. As a result, on edge 532 of the system clock (waveform 500), both of counters 414 and 416 are incremented by "two", as indicated by waveforms 516 and 518, respectively. This operation is repeated on the next rising edge 534 of the system clock, at which time the contents of both counters 414 and 416 are incremented to "four".

Shortly after edge 534 of the system clock, high-active DRDY_SYNC signal 316 is deactivated, as illustrated by waveform 505. This results in counters 414 and 416 again receiving their input from registers 410 and 412, respectively. In this manner, the P and N strobe read addresses are synchronized to the P and N strobe write addresses as a result of the idle bus cycle that occurs between the first and second data transfers. The process of incrementing the P and N strobe read addresses via the system clock is then repeated starting at edge 536 of the clock when DRDY_SYNC 316 once again goes active during the second data transfer. This allows the P and N strobe read addresses to increment from "4" to "6", and finally back to "0" again.

Finally, the signals available at the outputs of multiplexers 322-328 are considered. Because the P and N strobe read addresses are initially set to "0" in the current example, these multiplexers are configured to transfer data at their "0" inputs to their outputs. Specifically, data words "a"-"d" are transferred to the outputs of these multiplexers 322-328, respectively, as these words are latched into FIFO. This is illustrated by waveforms 522, 524, 526, and 528, respectively. Once available on the output of the multiplexers, a next available edge of system clock 305 may be used to store the data into data buffer 320 under the control of buffer write control circuit 350. In this manner, the first four words are transferred to data buffer 320.

When the P and N strobe read addresses change to "two" at clock edge 532, words "e"-"h" are transferred from the multiplexer inputs "2" to the multiplexer outputs, where they are available to be clocked into data buffer 320. This is shown by waveforms 522-528, respectively. A similar operation occurs at clock edge 534, when words "i"-"l" become available at the multiplex outputs. The final four words become available at clock edge 538.

In the above-described manner, two full data transfers are received by FIFO 306 using the P and N strobes. This data is then transferred into the data buffer 320 via the system clock

305. The process of FIG. 5 may be repeated any number of times. At least one dead cycle separates any two of the data transfers, thereby allowing the P and N read addresses to be re-synchronized with the P and N write addresses in the above-described manner.

Before continuing, it will be noted that FIG. 5 depicts a scenario wherein no latency is imposed by bus 202. For instance, the same waveform 504 is provided to represent DRDY at both the transmitting processor and the receiving controller 204. Similarly, waveform 510 is provided to represent data at both the transmitter and receiver. In practice, delay will be imposed by the bus 202 such that a waveform representing receipt of DRDY at the receiver will be shifted in time somewhat from the waveform representing transmission of this signal. This is discussed below in regards to FIG. 7.

FIG. 5 illustrates a situation wherein no glitches occur on either the P or N strobes. The above-described process is complicated when glitches occur on these signals. As discussed above, the major cause of such glitches are signal reflections on improperly terminated PCB interfaces. Such glitches are most typically observed after the last rising (that is, the trailing) edge of the strobes. For instance, in reference to FIG. 5, it is most likely that a glitch will occur in association with edge 540 (waveform 506) of the P strobe as compared to occurring in association with a prior edge of that strobe. When this type of glitch occurs, state devices within the data receiver circuit 214 may be erroneously clocked. This can best be appreciated by returning to FIG. 4. Assume that a glitch occurs in association with edge 540 of waveform 506 (FIG. 5). That glitch triggers counter 400. As a result, the P strobe write address no longer points to FIFO register 8 as it should in preparation for receipt of the first word of the second data transfer. Instead, the P strobe write address points to FIFO register 10. Therefore, during the second data transfer, the first word of data will be stored to FIFO register 10. If this glitch on the P strobe were not made visible to read control logic 330, the read control logic will acquire data from FIFO register 8 in the "normal" manner described above. Thus, although the data will be stored to register 10, an attempt would be made to read this data from register 8, resulting in retrieval of residual data from some previous data transfer such that data corruption occurs.

To remedy the above situation, the P strobe read address contained within counter 414 must be synchronized with the P strobe write address contained within counter 400. The current invention allows this to occur during the bus idle cycle, as may be appreciated by returning to FIG. 4. As mentioned above, registers 410 and 412 are always tracking the P and N write strobe addresses contained within counters 400 and 404. When DRDY_SYNC signal 316 becomes inactive as a result of the bus idle cycle, counters 414 and 416 containing the P and N strobe read addresses receive their input from registers 410 and 412, which store the P and N write strobe addresses, respectively. In this manner, the P and N read strobe addresses are synchronized to the P and N strobe write addresses during any bus idle cycle.

Returning to the current example, assume that the P strobe experiences a glitch that erroneously clocks counter 400, thereby incrementing the P strobe write address prior to a next data transfer. This will not affect previously-captured data, which will be read from FIFO 306 correctly. During the ensuing bus idle cycle, the P and N strobe read addresses are synchronized with the P and N strobe write addresses. In this example, the N strobe read address remains at "4" but the P strobe read address within counter 414 is loaded from register 410 with the value of "5".

During the next cycle, and after the read strobes are synchronized in the above-described manner, the second data transfer is received. The first word "i" of this transfer (waveform 510 of FIG. 5) is stored within register 10 based on the P strobe write address which was erroneously incremented. The second word "j" of this transfer is stored within register 9 as it "normally" would be because the N strobe write address was not erroneously incremented. The third word "k" is stored within register 12 based on the incremented P strobe write address, and the fourth word "l" is captured by register 11 in the normal manner. The next two words "m" and "n" are stored within registers 14 and 13. Finally, the last two words "o" and "p" of the transfer are stored within registers 0 and 15.

The data will be read from the FIFO 306 using the incremented P strobe read address and the "normal" N strobe read address described above. This means the first P strobe read address to be provided on lines 336 to multiplexers 322 and 326 is "5" rather than "4". To obtain the correct data, inputs "5" of multiplexers 322 and 328 must be coupled to FIFO registers 10 and 12, respectively. This allows words "i" and "k" to be read correctly. Words "j" and "l" will be read from FIFO register 9 and 11 using the "normal" N strobe read address.

Recall that after the first four words of the transfer are read, the P and N strobe read addresses in counters 414 and 416, respectively, are incremented by "2". Therefore, the P strobe read address in counter 414 is now set to "7". This address is supplied on lines 336 to multiplexers 322 and 326, selecting inputs "7". Thus, these inputs must be coupled to the outputs of FIFO registers 14 and 0, thereby allowing words "m" and "o" to be obtained. Words "n" and "p" are obtained from registers 13 and 15 using the "normal" read address of "6".

In a manner similar to that described above, the inputs of multiplexers 322-328 may be coupled in a manner that allow for the recovery of glitches occurring on trailing edges of the P and N strobes. This is discussed further in regards to FIG. 6.

Figure 6:
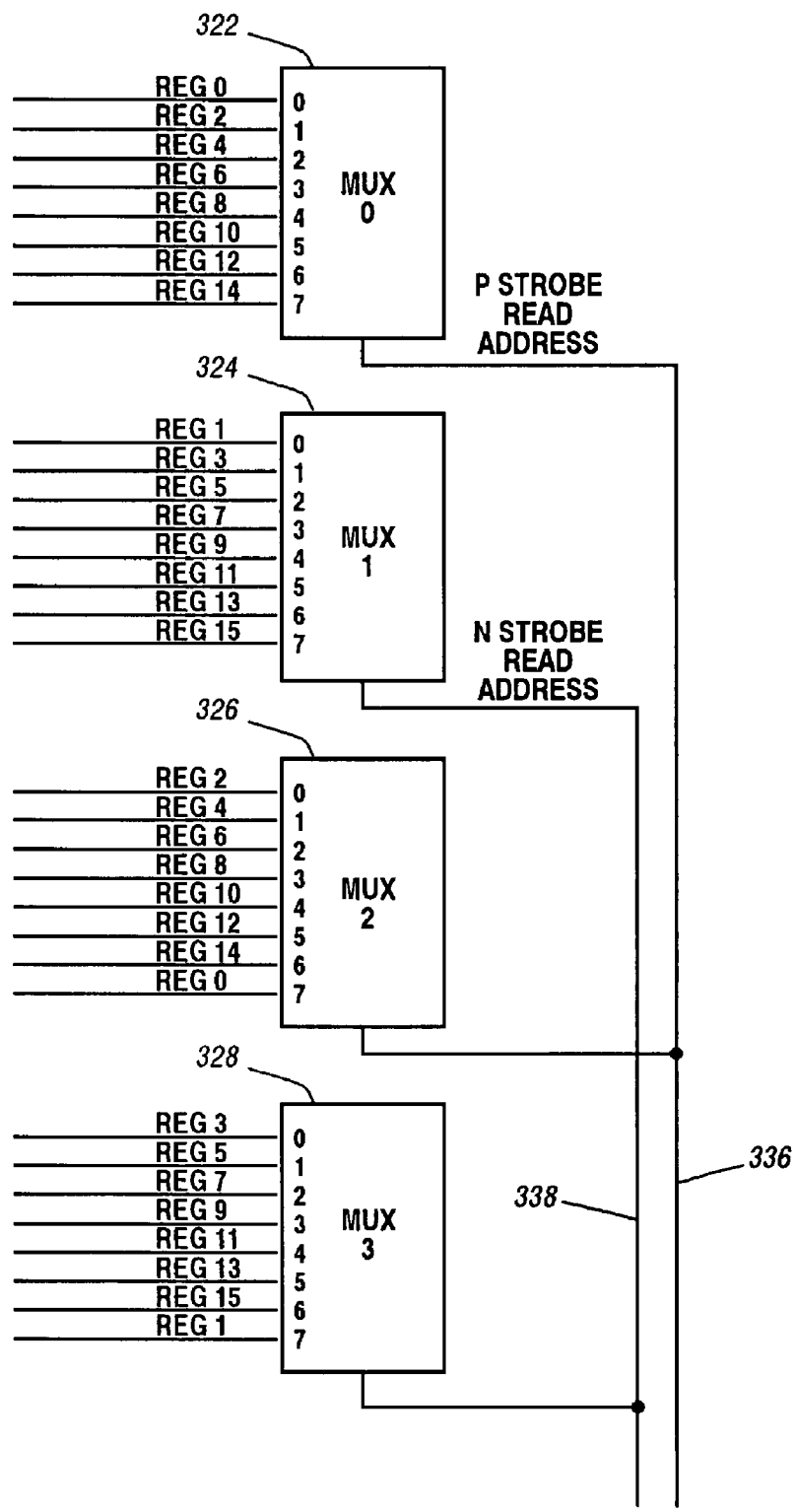
FIG. 6 is a block diagram of the multiplexers of FIG. 3 illustrating all input connections that are used for recovering from glitches that occur on the last edge of a P or N strobes during a data transfer.

FIG. 6 is a block diagram of multiplexers 322-328 illustrating all input connections that are used for recovering from glitches that occur on the last edge of a P or N strobes during a data transfer. This diagram includes the multiplexer input connections shown in FIG. 3. This diagram further illustrates inputs "5" and "7" of multiplexers 322 and 326 coupled to the appropriate FIFO registers in the above-described manner to account for a glitch on the last trailing edge of the P strobe for a first data transfer.

In a manner similar to that discussed above, a glitch may also occur on the last trailing edge of an N strobe for a data transfer. After synchronization of the N strobe read and write address signals during a bus idle cycle, the N strobe read address will be set to "5". This address is provided to multiplexers 1 and 3 via lines 338. Thus inputs "5" of these multiplexers must be coupled to receive words "j" and "l" from FIFO registers 11 and 13, rather than from registers 9 and 11, as would "normally" be the case. In a similar manner, when reading the next four words of the second transfer, inputs "7" of these multiplexers must be coupled to receive words "n" and "p" from FIFO registers 15 and 1. These connections are shown in FIG. 6.

It may be noted that glitches may occur on both strobes at once and correct operation will still result. That is, after a first data transfer, both P and N strobe read addresses may be set to "5". In this case, words "i" and "j" will be read from FIFO registers 10 and 11, respectively. The next two words will be correctly read from registers 12 and 13, and so on. No data corruption will occur.

The above discussion focuses on a glitch occurring on either or both of the N or P strobes during a trailing edge of the first data transfer. A similar mechanism applies to a glitch occurring on a last trailing edge of either or both of these strobes at the end of the second data transfer. In this case, either or both of the P and N strobe will be incremented from the "normal" value of "0" to "1". To account for this, inputs "1" of multiplexers 322 and 326 must be coupled to the outputs of FIFO registers 2 and 4. Similarly, inputs "1" of multiplexers 324 and 328 must be coupled to the outputs of FIFO registers 3 and 5. Likewise, inputs "3" of multiplexers 322 and 326 must be coupled to FIFO registers 6 and 8. Inputs "3" of multiplexers 324 and 328 must be coupled to FIFO registers 7 and 9. These connections are shown in FIG. 6.

In the foregoing manner, proper operation will continue when glitches occur on a last trailing edge of a P and/or N strobe. Data will be captured in the correct state, and no parity error will be detected. This type of detection and recovery from a trailing edge glitch is important since, as it was stated earlier, in some circuit designs, large signal reflections capable of causing glitches are most typically observed after the trailing edge rather than some other edge of the strobes.

Figure 7A:
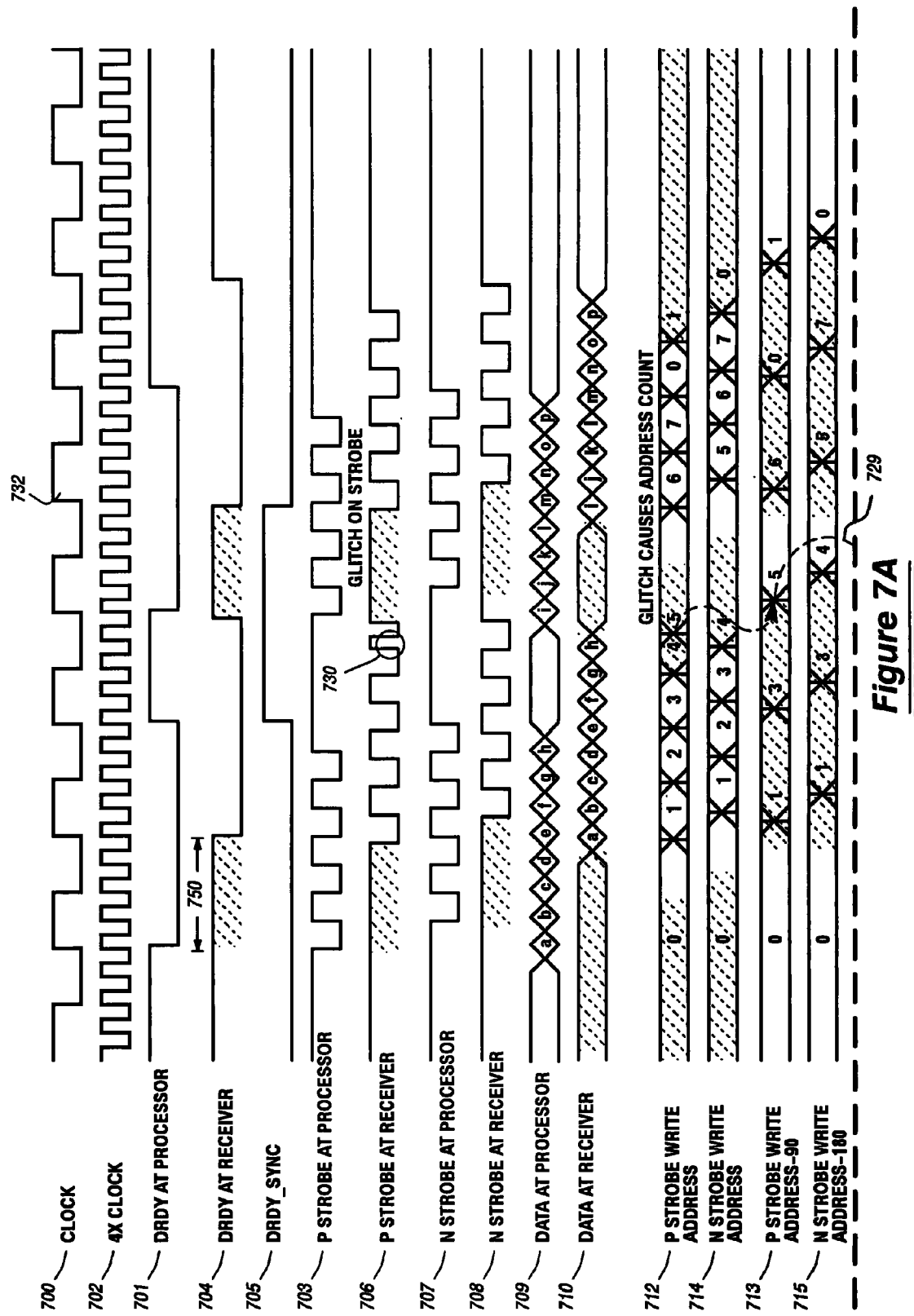

FIGS. 7A and 7B, when arranged as shown in FIG. 7, are a timing diagram illustrating operation of the invention when a glitch occurs on the last trailing edge of the P strobe following a data transfer. For ease of comparison, waveforms in FIG. 5 correspond with waveforms in FIG. 7 that have the same least significant digits. For instance, the clock signal of FIG. 5 is designated waveform "500" whereas the corresponding clock waveform of FIG. 7 is designated "700", and so on.

FIG. 7 is somewhat different from FIG. 5 because FIG. 5 represents a transfer wherein no latency is imposed by bus 202, as discussed above. In contrast, FIG. 7 illustrates an example wherein a maximum delay time 750 (as shown in reference to waveform 704) is imposed by the bus 202 between the transmitter and receiver. This is discussed further below in regards to the waveforms.

Waveforms 700 and 702 represent the internal clock signal and the 4× clock signal, which is the signal having a frequency four times the internal clock. Waveform 701 illustrates the DRDY signal at the transmitter, which in this example is one of processors 200A-200N. This DRDY signal indicates the start of the data transfer. The data at the transmitting processor is represented by waveform 709, and the P and N strobes at the processor are shown in waveforms 703 and 707, respectively.

Some time elapses while the signals are transmitted across the bus 202 to the receiver, which in this example is controller 204. This imposed delay time 750 is shown in reference to waveform 704. Thus, each of the signals, including DRDY, the data, and the P and N strobes are shifted by time period 750 at the receiver. Receipt of these signals at the receiver is represented by waveforms 704, 710, 706, and 708, respectively.

For purposes of the current discussion, it will be assumed that the P and N strobe write addresses are initially set to "0" to select FIFO registers 0 and 1 to receive the first two words "a" and "b" of the initial transfer. This is represented by waveforms 712 and 714. After the first two words are captured by the falling edge of the P and N strobes illustrated by waveforms 706 and 708, respectively, the P and N strobe write addresses are incremented to "1" in preparation to capture the next two words. This continues until all eight words are captured in registers 0-7 of the FIFO.

In the manner described in reference to FIG. 5, the P and N strobe read addresses shown in waveforms 716 and 718 (FIG. 7B) select the appropriate FIFO registers so that words "a"-"d" are first presented at multiplexer outputs, followed by presentation of words "e"-"h". This is represented by waveforms 722-728, which are similar to waveforms 522-528 of FIG. 5.

Unlike the scenario of FIG. 5, a glitch 730 occurs on a trailing edge of the P strobe following the first data transfer, as shown in waveform 706 of FIG. 7A. This causes erroneous incrementation of the P strobe write address from "4" to "5", as shown in waveform 712.

After occurrence of the glitch, the P strobe read address will be synchronized with the P strobe write address using the DRDY_SYNC signal 316 in the manner described above. Specifically, the high-active DRDY_SYNC signal 316 shown in waveform 705 is shifted by two rising clock edges of system clock 305 (waveform 700). As long as this signal is high active, the P and N strobe read addresses are incrementing, as shown by waveforms 716 and 718. However, when this signal goes inactive at edge 732 of the system clock (waveform 700), synchronization of the P and N strobe read addresses to the P and N strobe write addresses occurs. Thus, the P strobe read address is updated to "5", as indicated by arrow 729 (see waveform 716 of FIG. 7A). Thereafter, incrementation of this P strobe read address occurs from "5" to "7" and from "7" to "1". Incrementation of the N strobe read address occurs "normally" from "4" to "6" and from "6" to "0". This corresponds to the operation illustrated in FIG. 5.

As may be appreciated, the ability to synchronize the strobes in the above-described manner provides for the recovery from glitches occurring on the trailing edges of the strobes. According to the current invention, this synchronization also serves another purpose. In one embodiment, the P and N strobe write counters will not be initialized to any predetermined value following system reset. In other words, when data receiver 214 exits the reset state, each of counters 400 and 404 will not necessarily be pointing to registers 0 and 1, respectively. Instead, counter 400 may be pointing to any one of the even-numbered FIFO registers 0-14. Similarly, counter 404 may be pointing to any one of the odd-numbered FIFO registers 1-15. To ensure proper operation, the P and N strobe read addresses must be synchronized to the P and N strobe write addresses before the first data transfer occurs. This synchronization will be enabled because, prior to the first data transfer, the bus idle signal 418 will go inactive for at least one cycle following the deactivation of system reset signal 452. This allows the counters 414 and 416 to be loaded from registers 410 and 412, thereby becoming synchronized to the P and N strobe write addresses. Thus, the P and N strobe write addresses may point to any combination of registers so long as synchronization occurs between these addresses and the read addresses prior to the start of the first data transfer.

The current invention also provides for glitch detection and reporting. Returning to FIG. 4B, compare circuit 420 is continually comparing the P strobe write address of register 410 with the P strobe read address of counter 414. If no glitches have occurred on the P strobe, the P strobe write address will be the same as the P strobe read address when the bus idle signal on line 418 is high-active. If the two address signals are not the same at this time, AND gate 424 generates an active P strobe glitch signal 426.

In a similar manner, compare circuit 430 compares the N strobe write address of register 412 to the N strobe read address of counter 416. If no glitches have occurred on the N strobe, the N strobe read address will be the same as the N strobe write address when the bus idle signal 418 is high-active. If this is not the case, AND gate 434 asserts the N strobe glitch signal 436.

In one embodiment, the P and N strobe glitch signals 426 and 428 are provided to status and configuration registers 213 (FIG. 2) via maintenance interface 210 (shown dashed in FIG. 4B). The status and configuration registers 213 may then be read by maintenance processor 212 or via the operating-system-assigned thread of one of the processors 200A-200N. The reading of registers may be facilitated by an in-band CSR ring, for instance. If any glitches are detected, the glitches will be logged. Glitch reporting will assist printed-circuit board engineers in identifying signal integrity problems with the strobe signals.

As mentioned above, data receiver 214 also includes parity detection logic 364 (FIG. 3). This logic is continually checking parity on the data that is being provided by the multiplexers 322-328 to data buffer 320. If a parity error occurs, a parity error signal is provided via interface 210 to status and control registers 213 to be read by either maintenance processor 220 or a system processor depending on the system configuration. The appropriate recovery action is determined and initiated. In some embodiments, the occurrence of the parity error may initiate an automated re-boot procedure that is controlled by the hardware. Thereafter, recovery will be performed by the maintenance or system processor.

When a glitch occurs on a trailing edge of a P or N strobe in the manner described above, recovery will occur without data corruption, and without generation of a parity error. However, if a glitch occurs on a strobe edge that is other than a trailing edge, the mechanism of FIG. 4 will not recover from the glitch. In this case, data corruption will be detected by generation of a parity error that is reported via CSR access to maintenance processor 220, which will then initiate a recovery action. This action may involve a retry operation, or in a worst-case scenario, a system stop.

The glitch recovery and detection mechanism of the current invention allow glitches to occur on a trailing edge of a P or N strobe without resulting in data corruption. The glitches are further reported via interface 210 and read by maintenance processor 212 so that system debug may be initiated. In one embodiment of the invention, these glitch detection and recovery mechanisms may be selectively disabled as follows.

Maintenance interface 210 may be employed by maintenance processor 220 to access programmable logic that is provided within bus idle disable logic 450 (FIG. 4). Alternatively or additionally, one or more of processors 200A-200N that have been designated to function as the system processors may be provided with access to this programmable logic. This access may be facilitated via a scan-set operation or any other similar operations known in the art.

Once this bus idle disable logic 450 is programmed via maintenance interface 210 in the foregoing manner, the high-active bus idle signal 418 will no longer be generated during idle bus cycles. In this case, the bus idle signal 418 will only be generated once following deactivation of a system reset signal on line 452. This will allow for a one-time synchronization operation. At this time, counters 414 and 416 will be synchronized with the contents of registers 410 and 412, respectively. This synchronizes the P and N strobe read addresses to the P and N strobe write addresses, respectively, in preparation to begin receiving data from the bus. Thereafter, because glitch recovery is disabled, any glitches that occur on the P and/or N strobes will cause these strobes to become unsynchronized, and will likely result in data corruption. Generally, this will result in a system stop that will cause execution to be temporarily halted. This data corruption will be signaled by the occurrence of parity errors in the manner described above. It may be desirable to run in this mode during testing, for instance, so that the first occurrence of a parity error will be readily detected.

In a similar manner, maintenance processor 220 or a system processor 200 may selectively program glitch detection disable logic 454 to disable glitch reporting. When this occurs, a signal on line 456 is asserted to block gates 424 and 426 from activating the P and N strobe glitch signals on interface 210.

The bus idle disable logic 450 and glitch detection disable logic 454 may be programmed individually. In this manner, glitch recovery may remain enabled while glitch reporting is disabled or vice versa. Alternatively, both glitch recovery and detection may be disabled.

As previously mentioned, regardless of whether glitch recovery is enabled by bus idle disable logic 450, counters 414 and 416 are enabled to capture the contents of registers 410 and 412 as the system reset signal on line 452 is deactivated following a reset. This allows the initial P and N strobe read addresses to be synchronized to the initial P and N strobe write addresses before normal operation begins. As previously discussed, this is important because, according to one embodiment of the invention, counters 400 and 404 are not initialized to any predetermined value during reset.

Figure 8:
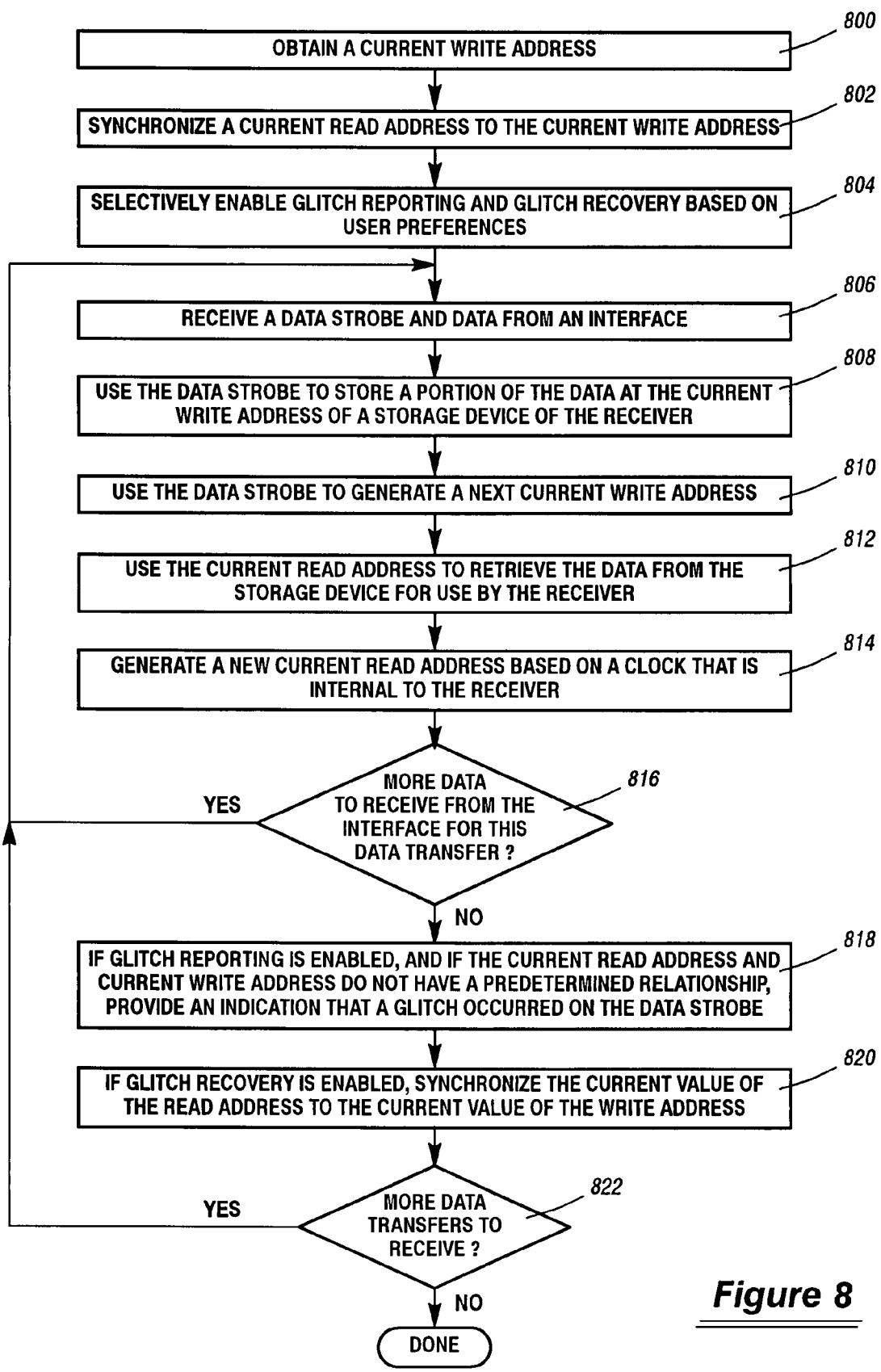
FIG. 8 is a flow diagram of one embodiment of a method according to the current invention.

FIG. 8 is a flow diagram of one embodiment of a method according to the current invention. This simplified embodiment assumes that only a single data strobe is being received with the data. However, any number of data strobes may be provided. For instance, FIGS. 3-7 illustrate the use of two data strobes, the P and N strobes. In yet another embodiment, more than two data strobes are possible within the scope of the current invention.

According to the method of FIG. 8, a current write address is obtained (800). This may occur following reset, for instance. In one embodiment, the initial write address is not set to any predetermined value, but instead is allowed to assume any valid initial value. After the current write address is obtained, a current read address is synchronized with the current write address (802).

Next, in an embodiment that allows glitch reporting and/or recovery to be disabled, one or more of these mechanisms may be selectively enabled based on user preferences and system requirements (804). In one embodiment, this may be accomplished via a CSR or other maintenance interface, for example.

Sometime after the initial values for the current read and write addresses are obtained, a data transfer is received from the interface. In one embodiment, this will occur when the DRDY signal is activated on the interface, as discussed above. This data transfer will include data and an accompanying data strobe (806). This data strobe is used to store a portion of the data at the current write address of a storage device of the receiver (808). This data strobe is also used to generate a next value for the current write address (810). In one embodiment, this is accomplished using an active edge of the data strobe to increment the current write address.

After the data is stored within the storage device, the current read address is employed to retrieve the data from the storage device for use by the receiver (812). In one implementation, this involves transferring the data from the storage device, which is a FIFO, to a data buffer of the receiver in a manner that is synchronous with the internal clock signal of the receiver. Then a new current read address is generated using an edge of this internal clock signal (814).

If there is more data to receive for this data transfer (816), processing returns to step 806 wherein more data is received along with a strobe. Otherwise, processing continues to step 818. In step 818, following completion of the data transfer, glitch reporting is performed. Specifically, if glitch reporting was enabled in step 804, and if the current read address and current write address do not have a predetermined relationship, an indication is generated to signal that a glitch occurred on the data strobe. In the current embodiment, the predetermined relationship is "equal to". That is, a glitch will be detected if the current read address and current write address are not the same. In another embodiment, a different relationship may be used to make this determination. The occurrence of the glitch may be reported to a maintenance processor or some other entity responsible for performing error notification and recovery.

Also following completion of the data transfer, if glitch recovery was enabled in step 804, the current value of the read address is synchronized with the current value of the write address (820). This will provide for recovery from any glitch occurring on the last-received edge of the data strobe for the current transfer.

Next, if more data transfers are to be received (822), processing returns to step 806 to wait for receipt of more data and the accompanying data strobe. Otherwise, processing is considered complete.

As may be appreciated, many variations exist for the method of FIG. 8, including an implementation that performs the steps of FIG. 8 for each of multiple data strobes. Additionally, although the current invention is described in relation to a bus 202, as shown in FIG. 2, it may be practiced with other types of interfaces, and other system configurations. For instance, a point-to-point interface that utilizes a data strobe to capture data may usefully employ the invention. Moreover, any transmitters and receivers may utilize the invention, and the description of its use during transfers between processors and controllers is merely exemplary. Thus, aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A system having a receiver to receive data from an interface using a data strobe provided with the data, comprising:
   write select logic to use predetermined edges of the data strobe to increment a counter and thereby generate addresses to a storage device of the receiver that will store the data;
   read control logic coupled to receive from the write select logic one of the generated addresses, and to use the received address to generate addresses within the storage device from which the data is to be retrieved; and
   compare logic coupled to the read control logic to compare a predetermined one of the addresses generated by the write select logic to a predetermined one of the addresses generated by the read control logic, and to thereby detect whether a glitch occurred on the data strobe.

2. The system of claim 1, wherein data is provided in multiple transfers, and wherein the read control logic is periodically coupled to receive from the write select logic an address to be used to capture a portion of data for a next data transfer, whereby if a glitch occurred on an edge of the data strobe most recently received by the receiver, read control logic will be synchronized with the write select logic so that the data will not be corrupted.

3. The system of claim 1, wherein the read control logic generates addresses using a clock signal of the receiver.

4. The system of claim 1, and further including a buffer coupled to the storage device, the read control logic to utilize the addresses generated by the read control logic to transfer the data from the storage device to the buffer at intervals that are asynchronous to the data strobe.

5. The system of claim 4, wherein the predetermined one of the addresses generated by the read control logic is a last address generated to read the data from the storage device.

6. The system of claim 1, wherein the predetermined one of the addresses generated by the write select logic is an address generated using a last edge of the data strobe that was received with the data.

7. The system of claim 1, further including parity detection logic to detect whether a parity error occurred on the data as it is read from the storage device.

8. The system of claim 1, further including a maintenance processor coupled to receive from the compare logic an indication as to whether a glitch occurred on the data strobe, and to further receive an indication as to whether a parity error occurred on the data, and to thereby determine whether corruption of the data occurred.

9. The system of claim 1, further including programmable logic to selectively disable one or more of a group consisting of
   the compare logic from detecting a glitch on the data strobe; and
   the read control logic from receiving from the write select logic the one of the generated addresses.

10. The system of claim 1, wherein the data is provided in multiple transfers, each separated by an idle cycle, and wherein during each idle cycle, the compare logic is enabled to determine whether a glitch occurred on the data strobe.

11. A method of receiving data by a receiver from an interface using a data strobe provided with the data, comprising:
    incrementing a counter in response to predetermined edges of the data strobe to generate one or more write addresses to a storage device that will store received data;
    utilizing at least one of said generated write addresses to generate one or more read addresses for use in retrieving the data from the storage device; and
    determining whether a predetermined one of the read addresses is the same as a predetermined one of the write addresses, and if not, providing an indication that a glitch occurred on the strobe.

12. The method of claim 11 further including repeating the steps of claim 11 for multiple data transfers, and wherein the predetermined one of the write addresses is a write address generated using a last-received active edge of the strobe of each of the data transfers.

13. The method of claim 11, wherein data is received during multiple data transfers, and further including periodically synchronizing the read address to the write address in preparation for receipt of a next data transfer.

14. The method of claim 13, wherein the synchronizing of the read address to the write address occurs at a time selected from a group consisting of:
    following a reset; and
    during an idle cycle of the interface that occurs between two successive ones of the multiple transfers.

15. The method of claim 11 further including providing two data strobes with the data, each to capture a predetermined portion of the data, and further including performing the steps of claim 11 for each of the two data strobes.

16. The method of claim 11 further including selectively disabling the providing of an indication that a glitch occurred on the strobe.

17. The method of claim 11 further including:
    determining whether a parity error occurred on the data; and
    determining, based on an indication of whether the parity error occurred and on an indication of whether the glitch was detected, whether data corruption occurred.

* * * * *